Sept. 13, 1955 R. E. BAKER 2,717,976

ELECTRICAL SIGNAL STORAGE

Filed July 10, 1951 3 Sheets-Sheet 1

INVENTOR
Richard E. Baker
BY J. L. Whittaker
ATTORNEY

INVENTOR
Richard E. Baker
BY J. L. Whittaker
ATTORNEY

Sept. 13, 1955 R. E. BAKER 2,717,976

ELECTRICAL SIGNAL STORAGE

Filed July 10, 1951 3 Sheets-Sheet 3

INVENTOR
Richard E. Baker
BY J. L. Whittaker
ATTORNEY

United States Patent Office 2,717,976
Patented Sept. 13, 1955

2,717,976

ELECTRICAL SIGNAL STORAGE

Richard E. Baker, Indianapolis, Ind., assignor to Radio Corporation of America, a corporation of Delaware Application July 10, 1951, Serial No. 236,016

7 Claims. (Cl. 315—13)

The present invention is related to the storage of electrical signals.

In the copending application of Richard E. Baker, entitled "Signal Display System," Serial No. 225,230, filed May 8, 1951, is described a system and a method for storing electrical signals for an indeterminate time. The copending application of Leslie E. Flory, entitled "Signal Storage System," Serial No. 225,197, filed May 8, 1951, which is now U. S. Patent No. 2,702,356 granted Feb. 15, 1955, discloses an improvement on the system of the said copending Baker application. In the said Flory application a pair of storage tubes are employed and electrical signals stored on one tube are withdrawn or read and stored on the second tube. New signals may, if desired, be mixed with the video signals read from the first tube and the composite video stored in the second tube. In similar fashion, the signals are withdrawn and read from the second tube, new signals being added thereto and stored back in the first tube. If the loop gain is approximately unity, it is apparent that the stored signals will be retained with little modification for a long time, yet with the possibility of adding new signals. If the loop gain is greater than unity, the signal amplitude will increase with storage time. If the loop gain is less than unity, the signals will decay at a rate dependent on the gain. This system of the Baker application teaches how to circulate a stored signal between two tubes with the result that the storage time may be greatly increased without a special tube being employed. These systems are of value in certain radar (radio echo detection and ranging) systems where an effective integration of signals corresponding to the same location may be achieved together with a consequent improvement of signal-to-noise ratio as a result of the integration. As a similar improvement in signal-to-noise ratios is contemplated in the present invention when used with a radar system in a similar manner, the reason for the improvement will become apparent hereinafter. These systems and that of the present application may also find utility in sonar (sound echo detection and ranging) or radar systems, where long storage times are required. For example, the highest persistence cathode ray tubes used in a P. P. I. (plan position indication) type of system, may be insufficient to allow display of the entire region being surveyed by the radar or sonar set at the desired rate of scan of the region. A system of increasing the storage time of the signals, yet permitting new signals to be added and the display of all the stored signals, is desirable.

In the copending application of Frank D. Covely and Richard E. Baker, entitled "Electrical Signal Storage," Serial No. 236,442, filed July 12, 1951, (RCA 34158), the systems of the Flory and Baker applications are improved by employing a single storage tube having separate reading and writing guns. The signals are stored as charges on the storage target of the tube by the writing beam. The reading beam is modulated by a signal of a frequency outside of the band of frequency components of the stored signals. This modulation employs frequency separation of the reading signals which are then delayed a certain time and re-applied to the writing beam. The writing beam lags the reading beam in its sweep over the target by a time corresponding to the delay in the circulating signal. All the stored information may be removed or erased from the circulating signal by merely interrupting the flow of the circulating signal for the desired time to accomplish the effective erasure. New signals may readily be added to the storage. One of the difficulties appearing in this system is that the stored signals tend to creep or move across the storage target as they are circulated. They may advance in one direction or the other along the target depending upon the accuracy with which the lag time of the writing beam following the reading beam corresponds to the circulated signal delay time. If this correspondence were exact and precise and if the beam width at the target were a point or the equivalent, there would be no creep of signals.

It is an object of the present invention to avoid the creeping along sweep lines of signals stored in such a system.

Another object of the invention is to improve the storage accuracy of such a system.

A further object of the invention is to improve the storage accuracy of stored signals with respect to their points of storage on the target and with respect to signal quality.

According to the invention the reading or writing sweep wave form of the reading or writing beams of the storage tube of a signal circulating system causes the beams to be deflected alternately at different speeds across the target. A wave form to thus deflect the beam may be obtained by adding to a linear wave form a voltage to cause the desired beam progression. Such a sweep tends to cause the creep to be isolated to the spots where one of the reading or writing beams is momentarily more or less rapidly deflected than the other. This ideal wave form for the deflection is readily approximated for practical purposes by the superposition of a high frequency sine wave on a linear deflection wave form. By these wave forms, a target creep is actually encouraged, but restricted to closely adjacent stable equilibrium storage points. It may be shown that such a wave form causes the creep to be isolated to many such points, and the signal creep is so limited in extent that its adverse and undesired effects are substantially eliminated. The present invention is disclosed but not claimed in the said Covely and Baker application, and is more fully explained and claimed herein.

The foregoing objects, and other objects, advantages, and novel features of the invention will be more apparent from the following description when taken in connection with the accompanying drawing in which.

Figure 1:
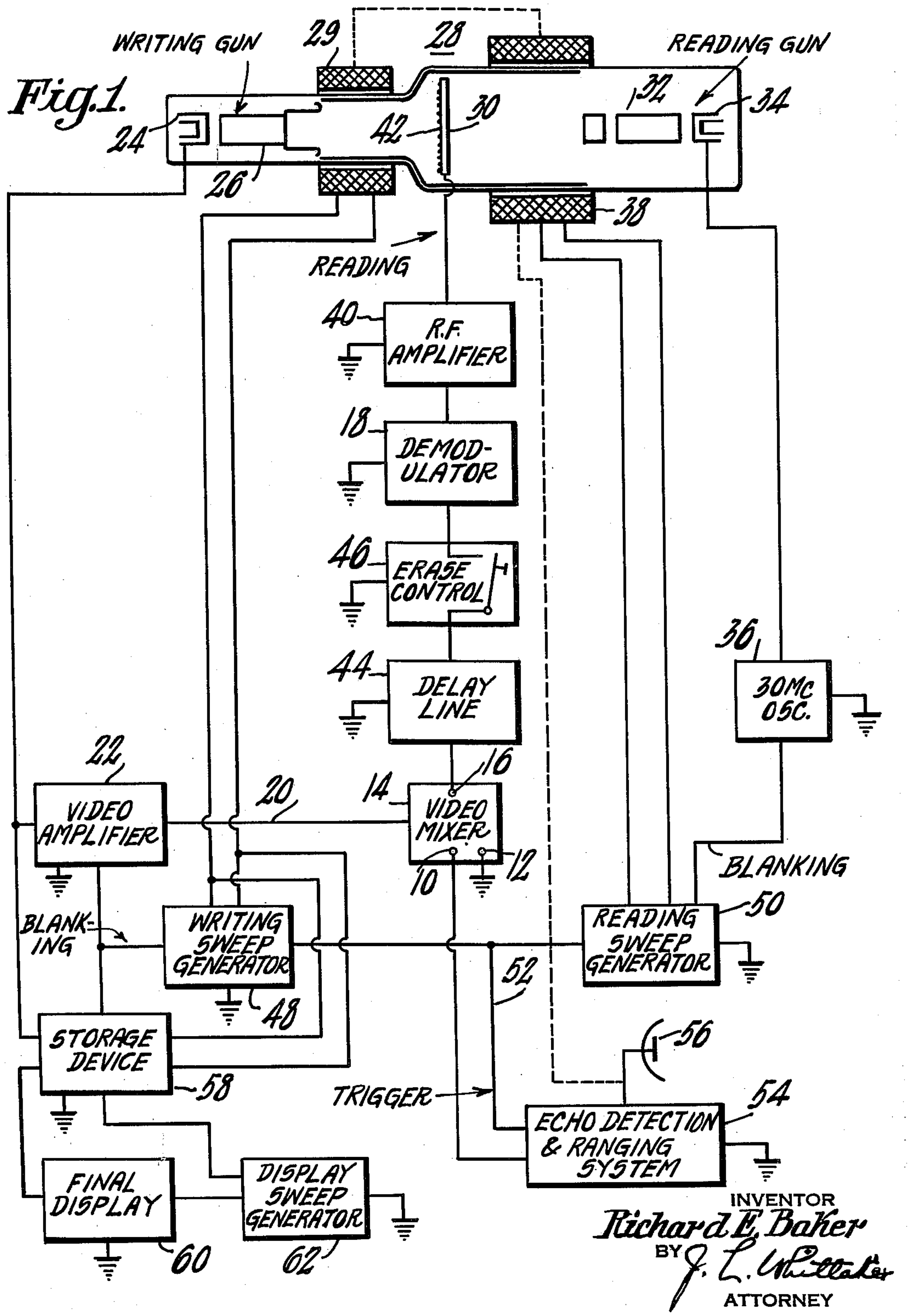
Fig. 1 is a diagram illustrating one embodiment of the invention.

Referring to Fig. 1, the signals to be stored may be applied between terminals 10 and 12 of a mixing circuit 14 which is to mix incoming signals with those just read. It may be presumed for illustrative purposes that these signals are to be stored in a storage tube and circulated as hereinbefore described. Since it is contemplated that the signals to be stored are of a type to be displayed on a cathode ray tube or the like, the circuit 14 is termed a video mixer. Preferably, for reasons set out hereinafter, a non-additive mixer is employed for video mixer 14. A discussion of such non-additive circuits and their employment may be found in Vacuum Tube Amplifiers, edited by Valley and Wallman, volume 13 of the Radiation Laboratory Series, starting near the bottom of page 100. Another improved form of such a non-additive mixing circuit which may be employed is disclosed in the copending application of Edwin M. Seabury, Serial No. 209,241, filed February 3, 1951, which is now U. S. Patent No. 2,695,953 granted November 30, 1954. The terminal 12 is connected to a common ground conductor conventionally indicated and which is omitted for convenience in the remainder of the circuit diagram.

The circulating signal is also applied to the non-additive video mixer at a terminal 16 from a delay line 44. The output of the video mixer is applied by a connection 20 to a video amplifier 22. A control element 24 of a writing electron gun 26 of a storage tube 28 receives the output of the video amplifier 22. Magnetic deflection coils 29, as illustrated, or well-known electrostatic deflection plates, may provide deflection means for the electron beam generated in the gun 26. The gun 26 is schematically shown without any power supplies being illustrated, such power supplies being well-known. The storage tube 28 may be of the type disclosed in the RCA Review for March, 1949, volume X, No. 1, starting at page 59, in the article by Louis Pensak, entitled "The Graphecon—A Picture Storage Tube." The tube illustrated corresponds to Fig. 3 of the RCA Review article, but the manner of use and connection of other two electron beam types discussed in the article for purposes of the present invention will be apparent to those skilled in the art from a study of the description of the invention herein disclosed. A target 30 of the storage tube receives the electron beam modulated by the signals from the amplifier 22 and stores an electrical charge corresponding to the signal at each point on the target 30 as the beam is swept across the target. A second electron gun 32 supplies a second beam of electrons on the reading side of the target 30. Control element 34 of the gun 32 receives a 30 mc./s. (megacycles per second) sine wave signal from a 30 mc./s. oscillator 36. The reading beam from the reading gun 32 may be deflected by suitable currents in the deflection coils 38. An R. F. (radio frequency) amplifier 40 receives signals from the signal electrode 42 of the target 30 and rejects or filters all signals except a 30 mc./s. signal including suitable side bands.

By reason of the oscillator, the stored signals from target 30 are impressed as modulation on the 30 mc./s. carrier received by the R. F. amplifier 40. The R. F. amplifier 40 serves also as a filter to reject signals being written at the same time the reading is in progress. After amplification, the signals from the R. F. amplifier 40 are demodulated in a demodulator 18 and thence passed through an erase control circuit 46 which is here illustrated as a simple switch. From the erase control circuit 46, the signals are applied to and delayed in the delay line 44 which may be, for example, a lumped constant circuit simulating the delay action of a two-wire line, or it may be any other one of other suitable known delay circuits. From delay line 44, as mentioned above, the signals are applied to the terminal 16 of the non-additive video mixer 14.

The system employs a pair of sweep generators, a writing sweep generator 48, and a reading sweep generator 50, both of which are synchronized by a suitable trigger signal applied to a connection 52. Actually, only one sweep generator may be employed if a suitable fixed delay is introduced before applying the output to the writing deflection coils 38. The circuit illustrated may be utilized in connection with a pulse echo detection and ranging system 54 from which pulses of R. F. energy are emitted from a radiator or receptor 56 and echoes received at radiator or receptor 56 are demodulated and applied as the video signals appearing at the terminal 10 of the video mixer 14. The echo detection and ranging system may be either a radar or sonar set, the radiator or receptor being respectively either an antenna or a sound radiator or receptor, as known. The trigger signal on connection 52 is synchronized with the emission of the pulse of energy. By way of example, it is assumed that the returned signals may be stored and ultimately displayed in the form of a plan position indicator display. For this purpose, there is provided a storage device 58 which may be another storage tube and a final display device 60 which may be a simple cathode ray tube having its own sweep generators 62. The interposition of the storage device 58 may be used so that slow sweeps giving a very bright final display may be used in reading signals from the optional storage device 58. The storage device 58 is not necessary and the voltages from the writing sweep generator 48 may be applied in suitable manner directly to the tube of the final display device 60, as by applying the signal from video amplifier 22 directly to the display device 60, provided the final display tube has a sufficiently long persistence phosphor.

In operation, the radar system 54 emits a pulse of radio frequency energy at the antenna 56. At the same time, the writing sweep generator 48 receives a trigger signal and applies a sweep voltage to the deflection coils 29 of the writing beam. The writing beam is thereupon deflected, for example, from the center of the target 30 radially outward at a constant rate. Any echoes received in the interval before the next trigger pulse are detected by the radar system 54 and applied to the terminal 10. If no previous signals have been stored or are circulating, the signal from the terminal 10 is applied to the video amplifier 22 and thence to modulate the writing beam by means of the control element 24. This modulation causes the storage of a charge on the target 30 at a point radially distant from the center at which the sweep is initiated by an amount proportional to the range of the echoing object from the radar system 54. The reading beam and writing beam deflection coils 38, 29 are connected mechanically to each other to rotate together and as by a servo or follow-up system (not shown) to the antenna 56. The antenna 56 is presumed in this instance to be of the type which is mechanically rotated to scan in azimuth, whereby the azimuth of the echoing object may be determined upon receipt of any echo. Accordingly, the deflection coils 29 and 38 cause the radial deflection of the writing and reading beams to be at the same angle from some predetermined radial line on the target 30 as the azimuthal angle of the antenna 56. Other means are known for controlling the sweeps of the two beams in coordinates with the angle of the radiated energy from which the echo is received. These means may be different from the simple arrangement indicated here. Other types of display may also be employed. The reading beam from the reading gun 32 is also deflected in radial manner by the coils 38 energized by the reading sweep generator 50, but travels in advance of the writing beam from the writing gun 26. Preferably, the advance is slight, and the two beams sweep the same strobe (radial line) at the same time, the one in advance of the other. Accordingly, previously stored signals are read or acquired from the target by the amplifier 40, demodulated by the demodulator 18, delayed a certain time by the delay line 44, and then applied to the terminal 16 of the video mixer 14. If no new signals are applied, the signals pass to the video amplifier 22 and thence are rewritten or re-stored. The delay time between the reading of the signal pickup up from electrode 42 and its passage around the loop comprising the R. F. amplifier 40, demodulator 18, erase control 46, delay line 44, mixer 14, video amplifier 22, and back to the control element 24 of the storage tube should be equal as nearly as possible to the time required for the writing beam to traverse the distance of separation on the target between the two beams. It is then apparent that the sored signal will be rewritten on the target at the same point from which it was read.

It is important in the system that the circulating loop time from the reading to the writing of a signal is large enough so that the reading beam travels ahead of the writing beam. If the two beams overlap, the reading signal would supply writing information during the writing of the information at the same points on the target. This would result in difficulties such as causing a target to be stretched to the end of the radial sweep so that it would subsequently appear as a single signal target having a width of a time duration corresponding to the length of the radial sweep from the range of initiation of the echo.

It is highly desirable also that the linearity, the size of beam spot, and the registry of the sweep lines be within accuracies equivalent to the storage element size. If this is not true, there will be a tendency for echoes to creep as they are circulated in the circulating loop to be stored again. That is, there will be a tendency for a signal, after its initial storage and after circulating around the loop a few times to be displaced from its initial storage poistion. This creep is obviously undesirable. The present invention, however, teaches how such creep may be avoided.

Figure 2:
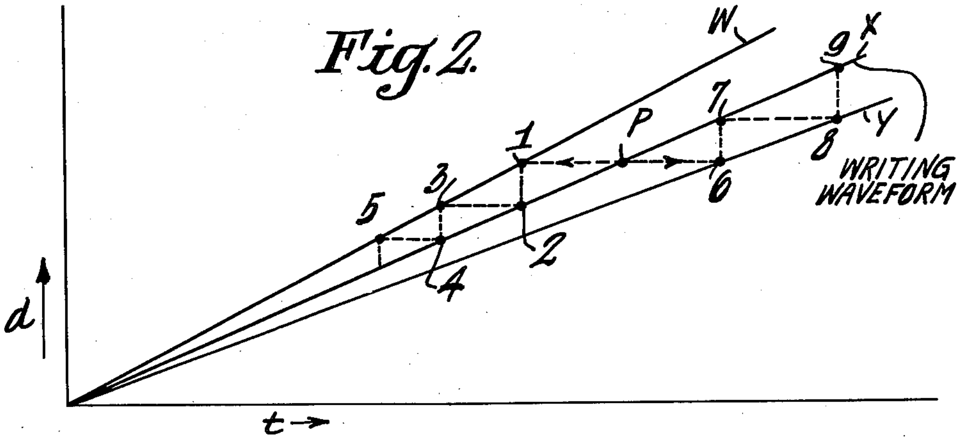
Fig. 2 is a graph of idealized wave forms illustrating more particularly the manner in which signal creep occurs.

The reason why the stored signals creep will be more apparent by referring to Fig. 2 in which time is plotted on the horizontal axis and the amplitude of the wave form applied to the reading and writing guns is plotted along the vertical axis, the vertical axis also representing the beam displacement across the target, indicated as *d*. In the storage system, assume the wave forms to be linear as plotted in Fig. 2 and that the reading beam travels ahead of the writing beam a distance equivalent to the delay encountered by the reading information that is rewritten on the target. If the old information or signals are not rewritten directly over their original storage position on the target, these signals will cause successive writing of old information in slightly different positions, which will again be stored in slightly different positions the next succeeding storage, et cetera. The spacing between the two beams, that is the lag of the writing beam after the reading beam, has been ignored in Fig. 2 to simplify the illustration. The straight line X represents the wave form having writing deflection current which is assumed linear. Line W represents a reading sweep wave form which causes displacement of the reading beam slightly in advance of exact registry with its proper displacement, being above the line X. In Fig. 2 the proper constant displacement is not illustrated, as mentioned, and exact registry with the proper constant delay would be indicated by the line W overlying the line X.

If a point P on line X is a signal initially written on the target during writing sweep X, the reading sweep W reads or picks up this signal at the same distance from the sweep origin of the reading beam, assuming that the origins are the same. Hence, in the reading, the signal appears to be at the point 1. Note that the fixed displacement between the beams in time has been ignored in the graph, as this will not affect the analysis of this part of the action. The point 1 will be rewritten at the corresponding point 2 on the target by the writing beam, and will re-appear at point 3 insofar as the reading beam is concerned. Hence, the point P progresses by the steps 1, 2, 3, 4, 5 toward the sweep origin in this example. On the other hand, if the reading sweep wave form Y represents a wave form which is in retardation of its proper position on the target, the point P will progress along the steps 6, 7, 8, 9 away from the sweep origin.

In order to prevent creeping, the anti-creep wave form may be added to a linear reading sweep wave form in the reading sweep generator 50 in such a way as to produce a modified sweep to cause the reading beam to step from point to point along the target. One ideal of a modified sweep wave form to inhibit creeping of stored signals may be with periods of slowly changing currents and periods of more rapidly increasing currents alternating. Such a sweep tends to cause the creeping to be isolated to the spots where the reading beam is momentarily undeflected. Such a current form applied to the reading deflection coils 38 would cause the reading beam to be displaced in its radial direction more rapidly and then more slowly by equal incremental steps, the separation between beam spots at the target being maintained. The lagging writing beam would cover the same line at a linear rate. This ideal wave form for the reading beam deflection is readily approximated by the superposition or addition of a high frequency sine wave on a linear deflection wave form which also is satisfactory in operation.

Figure 3:
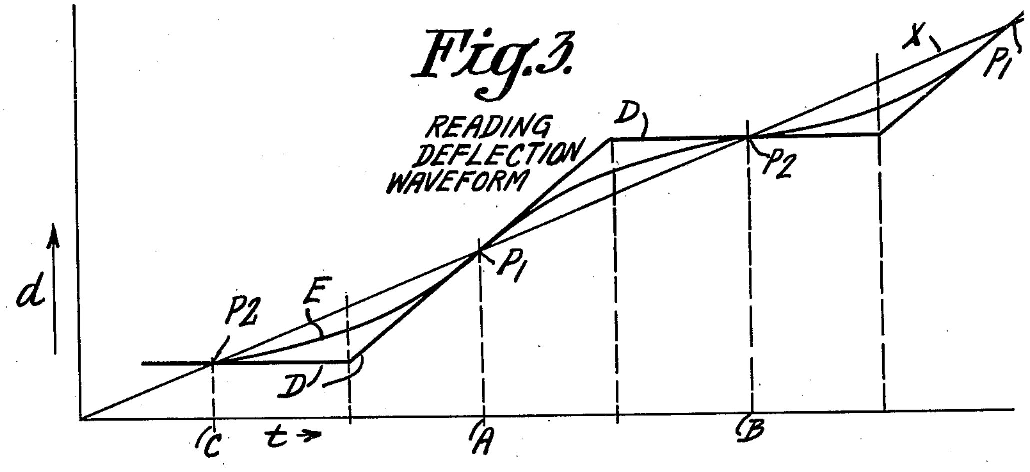
Fig. 3 is a graph illustrating an idealized deflection wave form according to the invention.

An ideal wave form to prevent the ill effects of creep is represented by wave form D of Fig. 3. From the analysis previously given in connection with Fig. 2, it will be apparent that if the straight line X in Fig. 3 (as in Fig. 1) represents the linear sweep wave form (providing constant velocity deflection) of the writing beam, then if a target is written between the times corresponding to A and B, it will tend to creep toward the start or origin of the sweep because the reading deflection wave form is in advance of exactly synchronized fixed advance of writing wave form equal to the delay time of the loop circuit. On the other hand, if the signal is first stored between the points corresponding in time to be between A and C, it will conversely progress toward the point corresponding to A because the reading deflection wave form is below the writing deflection wave form as illustrated in Fig. 3; that is, the reading deflection is in retardation of the fixed distance ahead of the writing wave form corresponding to exact synchronization with the loop circuit delay. The progression is easily indicated by the initial point of storage being shown as a point on the writing wave form and dotted lines illustrating the manner of progression. The points $P_1$ on the graph indicate points toward which the stored signals tend to progress. These are points of storage stability. These points, it will be observed, occur at points on the target where the writing beam is in retardation of the reading beam by exactly the distance corresponding to the loop circuit time delay, but with the writing beam (or the reading beam) moving at a rate to increase the distance; or what is the same, the writing beam is moving slower relative to the reading beam than should be the case to maintain exact synchronism with the desired loop delay.

If a signal were to be stored at such points as $P_2$, it will be clear that the signal should in theory remain at this point. However, it will be appreciated that on the next sweep over the same line, the cross-over may not occur at exactly the same corresponding point and the signal will tend to move one way or the other toward the points on the target corresponding to points $P_1$. These points $P_2$ may be considered as points of unstable equilibrium for storage, whereas the points $P_1$ are points of stable equilibrium for storage. The idealized wave form D may be approximated by a wave form E which will give substantially the same action as will be apparent from a study of the curves. The stored signals creep, but in a manner such that different signals converge separately on the separated points of stable storage equilibrium.

Figure 4:
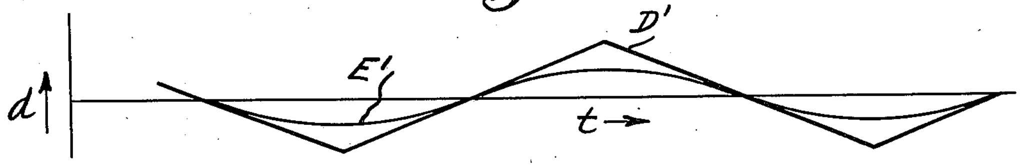
Fig. 4 is a graph illustrating wave forms which may be superimposed on a linear wave form to provide the desired anti-creep wave forms illustrated by Fig. 3.

Fig. 4 shows wave forms D' and E' which may be added to a linear sweep wave form to secure wave forms such as D or E of Fig. 3. The deflection wave forms should never have a negative slope as this will mean that there is a possibility of some signals being duplicated. Of course, during blanking, for example during fly-back, it is immaterial if there is some retrace.

Figure 5:
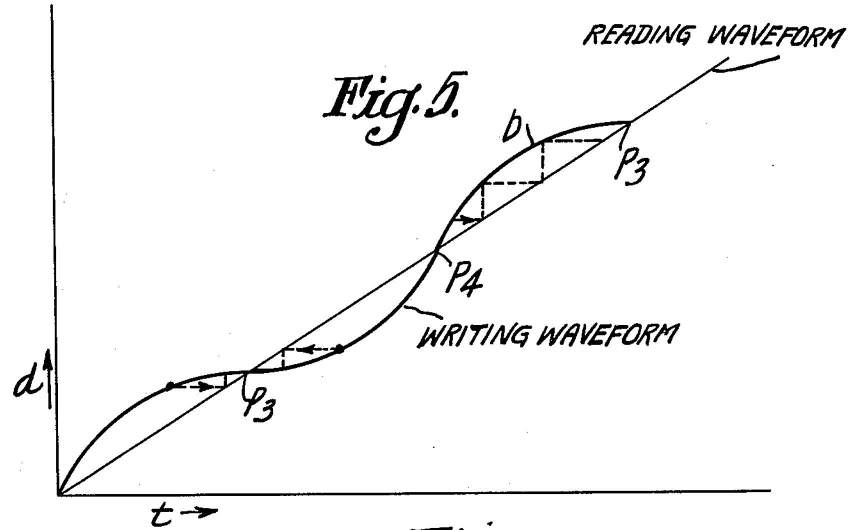
Fig. 5 is a graph illustrating a second set of idealized deflection wave forms according to the invention.

Referring now more particularly to Fig. 5, it will be apparent that one may have a linear reading deflection wave form such as W with a writing deflection wave form such as Z. Again there will be found points $P_3$ of stable equilibrium for storage and points $P_4$ of unstable equilibrium for storage. Thus all of the signals will tend to accumulate on the storage target at points corresponding to points $P_3$ of stable equilibrium for storage. The points of stable equilibrium of storage are again at the point where the writing beam is at a position exactly corresponding to the loop circuit delay, and that the writing beam is traveling at a speed to increase the lag, the cross-over points being as nearly fixed as possible so that signals stored will consistently progress to the same point of equilibrium between any two points of stable equilibrium.

Figure 6:
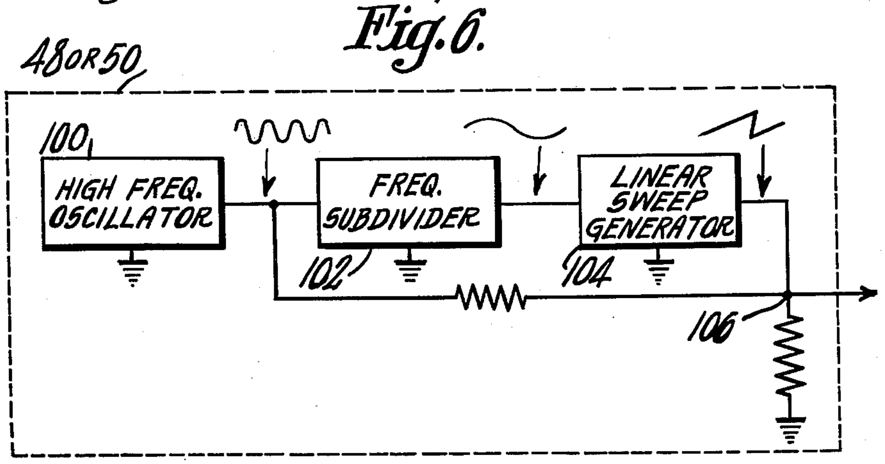
Figs. 6 and 7 are forms of sweep generator illustrating ways of producing the desired anti-creep wave form.
Figure 7:
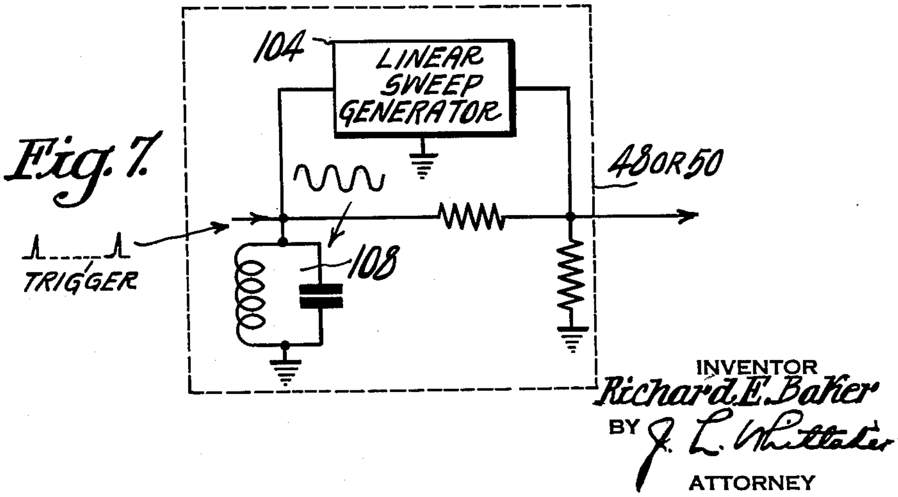

It is important, therefore, that if the anti-creep wave form, either for the reading or the writing sweep, is produced as by adding a sine wave to a linear wave form, that the phase relationship from initiation of the sweeps be maintained. This can be assured by any one of several methods. One method (see Fig. 6) is that of generating the desired superimposed sine wave in a high frequency oscillator 100 and subdividing the frequency in subdivider 102 to control timing of the sweep of linear sweep wave form generator 104. The wave forms are added at junction 106. Another method (see Fig. 7) could be to shock excite an oscillator circuit 108 with the basic sweep rate trigger signal controlling sweep generator 104 so that the added sine waves always start at the same phase at the start of the sweep whether it be the writing sweep or the reading sweep, and it may then be added to the linear sweep wave form.

The cross-over points or the points of stable equilibrium should be as close together as possible, there being a substantial number of them, but not closer than the limits of resolution of the storage tube. Thus, they should certainly be separated by at least the width of the beam. It will be understood that the lag of the writing beam behind the reading beam is still substantially equal to the delay time of the loop circulating signal circuit, this being exactly true as an average and for the equilibrium points. It will be observed and understood from the foregoing that the precise modification of the linear wave form is not critical, so long as the points of stable storage equilibrium remain reasonably well defined and fixed on the target.

There is a blanking signal indicated as applied from the reading sweep 50 to the 30 mc./s. (megacycles per second) oscillator 36. This blanking signal may be applied either through the oscillator 36 or directly to the control element 34. Its object is to prevent the reading of any signals beyond a certain point near the center of the radial sweep lines. Either the writing or reading of signals within this area may be prevented since if the signal is not being read or if it is not being written, there will be no reading of signals in this area. This blanking is merely to take care of the flyback time of the writing or reading beams because the writing beam obviously cannot write signals during its flyback time.

The non-additive mixer 14 is preferred because without it, for example, if a linear mixer is employed, new information may be linearly added to the old causing the writing grid signal to be, say, twice the amplitude of the original signal. Similarly for fixed targets. This might cause an effect similar to "blooming" in kinescope cathode ray tubes, with a spread of the electron beam, resulting in "cross-talk" between the beams, if the spread overlaps the reading beam. Or it may cause increase in the apparent area of received signals. The non-additive mixer avoids or at least tends to avoid such effects by keeping the writing signal below a specified value.

The anti-creep wave form takes care of creep in the range, or the direction of beam sweep, but not in azimuth (the deflection transverse to the range sweep). To avoid such azimuthal creep, each of the sweep lines may be displaced from an adjacent one a distance to prevent "cross-talk" or creep between adjacent sweep lines. This may be done if a central blanking interval of sufficient size is used. Alternatively, azimuthal angular intervals could be "blanked," only the alternate intervals being employed for the writing and reading of signals. The latter method could also be employed to prevent creep in range by blanking alternate small range intervals. However, to do so would involve a loss of signals which are saved by the system and method of the invention, thereby maintaining an improved signal-to-noise ratio by retaining all of the useful signals. The blanking schemes involve some loss of signals.

Several variations of the system are possible. If sufficient delay can be secured in the loop circuit, as may be possible with high velocity sweeps, the delay time may be the time of sweep of one line. It is preferred, however, to keep the beam deflections within a line limit. The inherent delay of the loop circuit may be sufficient without the delay line 44.

It is particularly pointed out here that the full capabilities of tthe tube 28 are employed and that the target is not divided in such a manner that the tube is being employed as the equivalent of two tubes, for example, it is not desired to write on half the target while reading on the other half and then use the techniques of the prior co-pending applications to reverse the writing and reading tubes.

Preferably, the loop gain of the circuit is approximately unity. In this event, signals from a single complete azimuthal scan, for example, could be written upon the tube 28 and due to the loop circuit, these signals would continue to be read and written for a comparatively long length of time. Theoretically there is no limit but in practice noise introduced by the circuits and by the storage tube would limit the length of time over which readable signals could be taken. If the signals are circulated, they may always be observed upon the final display device 60 or may be intermediately stored in the storage device 58 from which they are withdrawn for display in the device 60. The loop gain, however, may be less than unity, or with sufficiently frequent erasures to avoid saturation effects, may be greater than unity.

Erasure of stored signals is readily accomplished by interruption of the circulating signals by the erase control switch 46. If the tube operation is with complete erasure on reading, as preferred, interruption only once of any selected portion of the signals will completely destroy the storage. Otherwise, of course, repeated interruption of the selected signal portions for erasure of a part, or prolonged interruption for erasure of all of the circulating signals is required for complete erasure.

It will be apparent that a novel system for prolonged storage time of electrical signals has been disclosed in which with only a single storage tube and a suitable loop circuit the stored signals may be circulated and retained for storage, and avoiding the tendency of the signals to be removed any appreciable distance from their proper storage points in time on the storage target.

What is claimed is:

1. An electrical signal storage system comprising a storage tube having a storage target to store electrical signals, means for generating a first electron beam and means to deflect said beam in response to a wave form to write signals on said storage target, means for generating a second electron beam and means to deflect said second beam in response to a waveform to read the signals written on said storage target, a signal circulating loop circuit having an input connected to receive signals from said signal reading means and having an output connected to said signal writing means, and means to synchronize said writing and reading means in average time relationship with the reading means reading signals from points on the said storage target a time in advance of the writing means substantially equal to the delay time required for signals to traverse said loop circuit, said synchronizing means comprising means to produce a first sweep waveform of a first repetition frequency, means to produce a second waveform of a second repetition frequency substantially higher than said first and having a fixed phase relationship with the first waveform, means to modify the first waveform by the second waveform to produce a composite sweep waveform of the second superimposed on the first waveform and means to apply said sweep waveforms respectively to said deflecting means, thereby to produce a plurality of stable equilibrium storage points on said target, and whereby the creep of signals along the sweep lines on the target is restricted to converge at said points of stable equilibrium storage.

2. An electrical signal storage system comprising a storage tube having a storage target to store electrical signals, means for generating a first electron beam and means to deflect said beam in response to a waveform to write signals on said storage target, means for generating a second electron beam and means to deflect said second beam in response to a waveform to read the signals written on said storage target, a signal circulating loop circuit having an input connected to receive signals from said signal reading means and having an output connected to said signal writing means, and means to synchronize said writing and reading means in average time relationship with the reading means reading signals from points on the said storage target a time in advance of the writing means substantially equal to the delay time required for signals to traverse said loop circuit, said synchronizing means comprising means to produce a timing waveform, means to produce from said timing waveform a first sweep waveform having a fixed phase relationship to said timing waveform and having a certain repetition frequency means to produce from said timing waveform a secondary waveform having a fixed phase relationship to said timing waveform and having a substantially higher repetition frequency than that of said first sweep waveform, means to modify the first sweep waveform by the secondary waveform to produce a second sweep waveform of the secondary waveform superimposed on the first sweep waveform and means to apply said deflecting means, thereby to produce a plurality of stable equilibrium storage points on said target, whereby the creep of signals along the sweep lines on the target is restricted to converge at said points of stable equilibrium storage.

3. An electrical signal storage system comprising a storage tube having a storage target, a writing electron beam gun, wave form responsive means for deflecting the beam thereof, a reading electron beam gun, wave form responsive means for deflecting the beam thereof, means to store signals on said target including said writing gun, and means to read the stored signals comprising said reading gun, means to apply wave forms to said deflecting means, a signal circulating loop circuit connected to receive signals from said reading means and after a delay time apply said signals to said writing means for restorage on said target, means to generate wave forms connected to apply said wave forms to said deflecting means to deflect said beams over the same paths on said target with said reading beam on said target in advance of said writing beam on the average equal to said delay time, said sweep waveform generating means comprising means to produce a timing waveform means to produce from said timing waveform a first sweep waveform having a fixed phase relationship to said timing waveform and having a certain repetition frequency, means to produce from said timing waveform a secondary waveform having a fixed phase relationship to said timing waveform and having a substantially higher repetition frequency than that of said first sweep waveform and means to add the first sweep waveform and the secondary waveform to produce a second sweep waveform of the secondary waveform superimposed on the first sweep waveform, and means to apply said sweep waveforms respectively to said two beam deflecting means, thereby to produce a substantial number of stable equilibrium storage points on said target, whereby the creep of signals on the target is restricted to converge on said points of stable equilibrium storage.

4. The system claimed in claim 2, said first sweep waveform being a linear wave form to provide constant velocity beam deflection.

5. An electrical signal storage system comprising a storage tube having a storage target, a writing electron beam gun, wave form responsive means for deflecting the beam thereof, a reading electron beam gun, wave form responsive means for deflecting the beam thereof, means to store signals on said target including said writing gun, and means to read the stored signals comprising said reading gun, means to apply wave forms to said deflecting means, a signal circulating loop circuit connected to receive signals from said reading means and after a delay time apply said signals to said writing means for re-storage on said target, means to generate two sweep wave forms connected to apply said sweep wave forms respectively to said deflecting means to deflect said beams over the same paths on said target with said reading beam on said target in advance of said writing beam on the average equal to said delay time, said sweep waveform generating means comprising means to produce a timing waveform, means to produce from said timing waveform first sweep waveform linear in time and having a fixed phase relationship to said timing waveform and having a certain repetition frequency, means to produce from said timing waveform a secondary waveform sinusoidal in time and having a fixed phase relationship to said timing waveform and having a substantially higher repetition frequency than that of said first sweep waveform and means to add the first sweep waveform and the secondary sweep waveform to produce a second sweep waveform of the secondary waveform superimposed on the first sweep waveform, and means to apply said sweep waveforms respectively to said generating means, thereby to produce a substantial number of stable equilibrium storage points on said target, whereby the creep of signals on the target is restricted to converge on said points of stable equilibrium storage.

6. The system claimed in claim 5, the said means to produce said secondary waveform including an oscillator connected to receive said tuning waveworm to produce a high frequency sine wave, the said means to produce said linear sweep waveform comprising a frequency subdividing circuit connected to said oscillator to produce a lower frequency wave, a linear sweep generator connected to said frequency subdivider to produce said linear sweep wave form synchronized with said lower frequency wave, whereby said oscillator is a part of said means to produce said linear sweep waveform and of said means to produce said secondary waveform, said means to add waveforms comprising a resistor connected to said oscillator and said sweep generator to add said high frequency oscillator wave form and said linear sweep wave form thereby to produce said second sweep wave form.

7. The system claimed in claim 5, the means to generate said secondary wave form comprising a resonant circuit tuned to a high frequency, said timing waveform being pulses of lower repetition frequency than said high frequency, means to apply to said circuit said timing waveform pulses to shock excite said resonant circuit, thereby producing as said secondary waveform a high frequency wave train, said means to produce said linear sweep waveform including a linear sweep generator connected to receive the said low frequency pulses and to produce said linear sweep wave form synchronized with said pulses.

References Cited in the file of this patent

UNITED STATES PATENTS

| | | |
|---|---|---|
| 2,213,178 | Iams | Aug. 27, 1940 |
| 2,280,191 | Hergenrother | Apr. 21, 1942 |
| 2,547,638 | Gardner | Apr. 3, 1951 |
| 2,548,789 | Hergenrother | Apr. 10, 1951 |
| 2,617,963 | Arditi | Nov. 11, 1952 |
| 2,629,010 | Graham | Feb. 17, 1953 |